United States Patent
Tsukamoto et al.

(10) Patent No.: US 11,567,178 B2
(45) Date of Patent: Jan. 31, 2023

(54) LASER DISTANCE MEASURING DEVICE

(71) Applicant: Mitsubishi Electric Corporation, Tokyo (JP)

(72) Inventors: Shohei Tsukamoto, Tokyo (JP); Hiroshi Sakanoue, Tokyo (JP); Masaharu Imaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 393 days.

(21) Appl. No.: 16/833,025

(22) Filed: Mar. 27, 2020

(65) Prior Publication Data
US 2020/0400787 A1 Dec. 24, 2020

(30) Foreign Application Priority Data
Jun. 21, 2019 (JP) ............................. JP2019-115137

(51) Int. Cl.
*G01S 7/481* (2006.01)
*G01S 17/10* (2020.01)

(52) U.S. Cl.
CPC .......... *G01S 7/4817* (2013.01); *G01S 7/4814* (2013.01); *G01S 17/10* (2013.01)

(58) Field of Classification Search
CPC ...... G01S 7/4817; G01S 7/4814; G01S 17/10; G01S 7/4868; G01S 17/42
See application file for complete search history.

(56) References Cited

U.S. PATENT DOCUMENTS

| | | | | |
|---|---|---|---|---|
| 3,813,140 | A * | 5/1974 | Knockeart | G01S 7/4811 348/202 |
| 10,802,120 | B1 * | 10/2020 | LaChapelle | G01S 17/10 |
| 11,119,219 | B1 * | 9/2021 | LaChapelle | G01S 17/34 |
| 2013/0027715 | A1 * | 1/2013 | Imaki | G01S 17/10 356/601 |

(Continued)

FOREIGN PATENT DOCUMENTS

| | | | |
|---|---|---|---|
| DE | 102015200224 A1 * | 7/2016 | G01S 17/89 |
| JP | 60-169583 U | 11/1985 | |

(Continued)

OTHER PUBLICATIONS

Communication dated Aug. 18, 2020, from the Japanese Patent Office in application No. 2019-115137.

*Primary Examiner* — Roy M Punnoose
(74) *Attorney, Agent, or Firm* — Sughrue Mion, PLLC; Richard Turner

(57) ABSTRACT

The laser distance measuring device includes: a laser light emission unit for emitting laser light; a scanning mechanism for scanning the laser light by changing an output angle thereof; a light receiving unit for receiving reflected light of the laser light from an object, to thereby output a light reception signal; a light-detector control circuit for causing the light receiving unit to output the reception signal after setting a light receiving sensitivity for the reflected light at the time when the output angle is small, higher than a light receiving sensitivity for the reflected light at the time when the output angle is large; and a distance calculation unit for calculating, based on the reception signal, a distance to the object. This enhances the distance measuring capability in both cases of measuring a short distance and a long distance.

12 Claims, 14 Drawing Sheets

(56) References Cited

U.S. PATENT DOCUMENTS

| | | | |
|---|---|---|---|
| 2013/0342822 A1 | 12/2013 | Shiraishi | |
| 2015/0204980 A1 | 7/2015 | Matsuura | |
| 2021/0270939 A1* | 9/2021 | Sakurano | G01S 7/4865 |
| 2022/0043127 A1* | 2/2022 | LaChapelle | G01S 7/484 |

FOREIGN PATENT DOCUMENTS

| | | |
|---|---|---|
| JP | 07-191148 A | 7/1995 |
| JP | 2002-040139 A | 2/2002 |
| JP | 2015-135272 A | 7/2015 |
| JP | 2019-007879 A | 1/2019 |
| WO | 2012/117542 A1 | 9/2012 |

\* cited by examiner

|  | Lower side angle | Middle angle | Upper side angle |
|---|---|---|---|
| Resistance value of the feedback resistors as a whole | 38 kΩ | 42 kΩ | 46 kΩ |
| Capacitance value of the feedback capacitors as a whole | 0.2 pF | 0.4 pF | 0.6 pF |

FIG. 12

LASER DISTANCE MEASURING DEVICE

BACKGROUND OF THE INVENTION

1. Field of the Invention

The present application relates to a laser distance measuring device.

2. Description of the Background Art

Heretofore, laser distance measuring devices have been known which radiate each a light beam such as laser light to a measurement target, to thereby measure based on reflected light reflected off an object, a distance to that object. In such laser distance measuring devices, there is a scanning-type device which scans the laser light from a light source, over a specific scanning field by use of a scanning means. Many of the conventional laser distance measuring devices operate each under a specific pre-established device condition; however, different requirements may arise for the measuring device, for example, to use for measuring a short distance, a broadband amplifier because a high distance resolution is required for that distance, but to detect for measuring a long distance, weak light by reducing noises of the broadband amplifier because the received light is weak. In general, when the measuring devices are two-dimensional ranging sensors to be placed at their fixed positions, there are cases where their target distances are each fixed to a short distance or a long distance depending on its scan angle.

In order to solve this problem, according to the technology of Patent Document 1, laser light is radiated ahead of a vehicle and rays of reflected light coming respectively from different horizontal directions are concurrently received by a plurality of light receiving elements, and furthermore, from among these elements, multiple light receiving elements are selected in a given combination and light reception signals outputted from the thus-selected light receiving elements are added together and then outputted, so that light receiving sensitivity is enhanced.

Further, according to the technology of Patent Document 2, a laser distance measuring device mounted on a vehicle is configured with a plurality of light receiving elements, and its light receiving sensitivity is adjusted adequately in such a manner that, with respect to directions in which light reception signal is not yet detected, the number of integration times for light reception signal is increased according to the vehicle speed, to thereby improve an SNR (Signal to Noise Ratio) of light reception signal.

Patent Document 1: Japanese Patent Application Laid-open No. H07-191148 (paragraphs 0032 to 0036, FIG. 1 to FIG. 3)

Patent Document 2: Japanese Patent Application Laid-open No. 2015-135272 (paragraphs 0013 to 0015, FIG. 1)

However, when the band is narrowed in order to detect the weak light from a long distance, noises of high-frequency components are reduced, so that the noise level becomes lower and thus the signal level becomes higher; however, there is a problem that thus-narrowed band can not be applied for measuring a short distance (equivalent to a pulse width). Further, when the vehicle speed is a prescribed speed or more, there is a problem that, although the signal from a short distance can be separated off, long-distance measuring capability is degraded.

SUMMARY OF THE INVENTION

The present application discloses a technology to solve the problems as described above, and an object of the present application is to provide a laser distance measuring device which not only can be used for measuring a short distance, but also can keep the long-distance measuring capability undegraded.

A laser distance measuring device disclosed in this application is characterized by comprising: a laser light emission unit for emitting laser light; a scanning unit for scanning the laser light by changing an output angle thereof; a light receiving unit for receiving reflected light of the laser light from a reflector, to thereby output a light reception signal; a control unit for causing the light receiving unit to output the reception signal after setting a light receiving sensitivity for the reflected light at the time when the output angle is small, higher than a light receiving sensitivity for the reflected light at the time when the output angle is large; and a distance calculation unit for calculating, based on the reception signal, a distance to the reflector.

According to the application, the light receiving sensitivity for the reflected light is changed according to the output angle, so that it is possible to enhance distance measuring capability in both cases of measuring a short distance and a long distance.

The foregoing and other objects, features, aspects and advantages of the present application will become more apparent from the following detailed description when read in conjunction with the accompanying drawings.

BRIEF DESCRIPTION OF THE DRAWINGS

FIG. 12 is a diagram for illustrating set data indicating conversion gains and bandwidths for the gain and band change circuit in the laser distance measuring device according to Embodiment 1.

DETAILED DESCRIPTION OF THE EMBODIMENTS OF THE INVENTION

1. Embodiment 1

Figure 1:
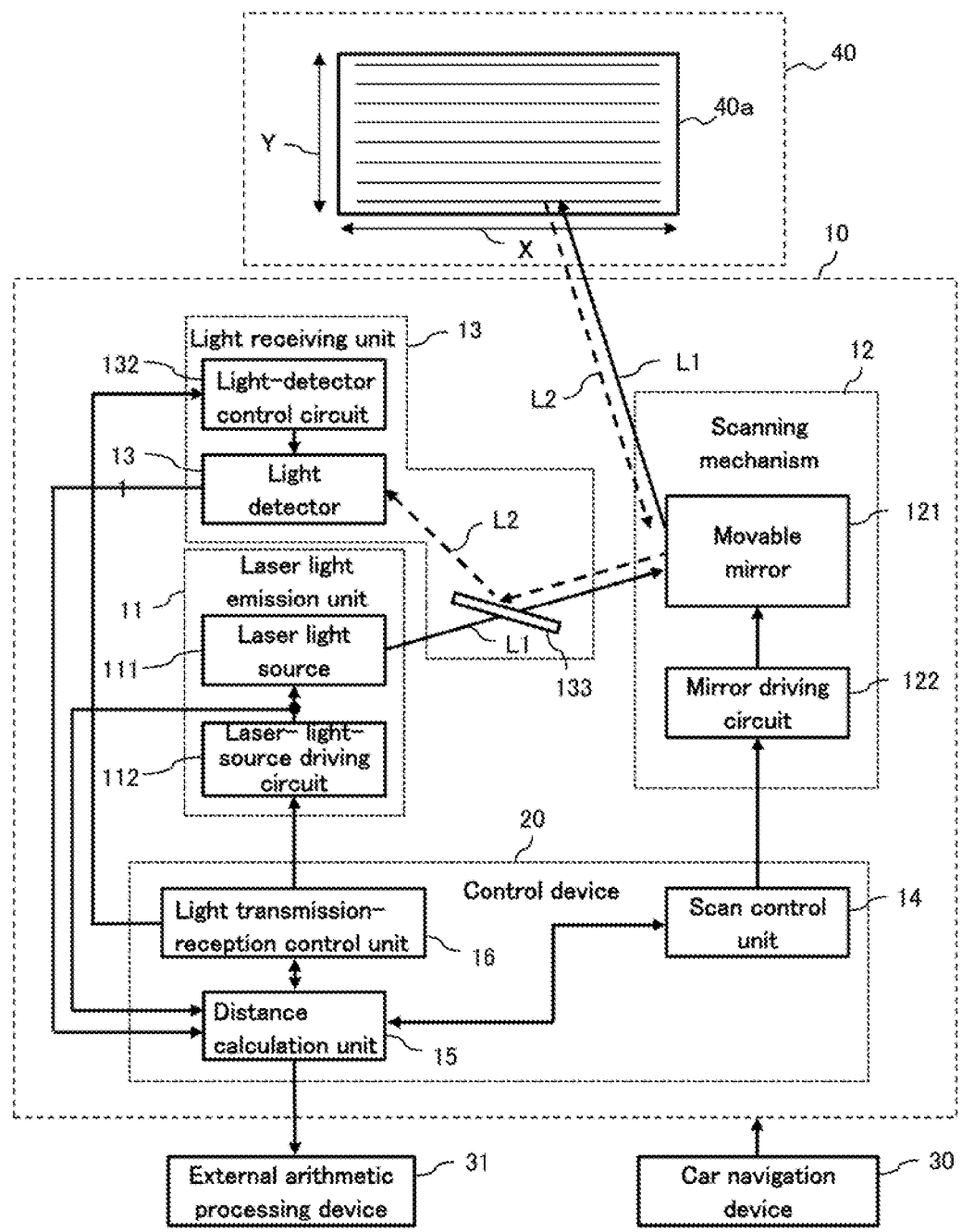
FIG. 1 is a block diagram showing an outline of a configuration of a laser distance measuring device according to Embodiment 1.
Figure 2:
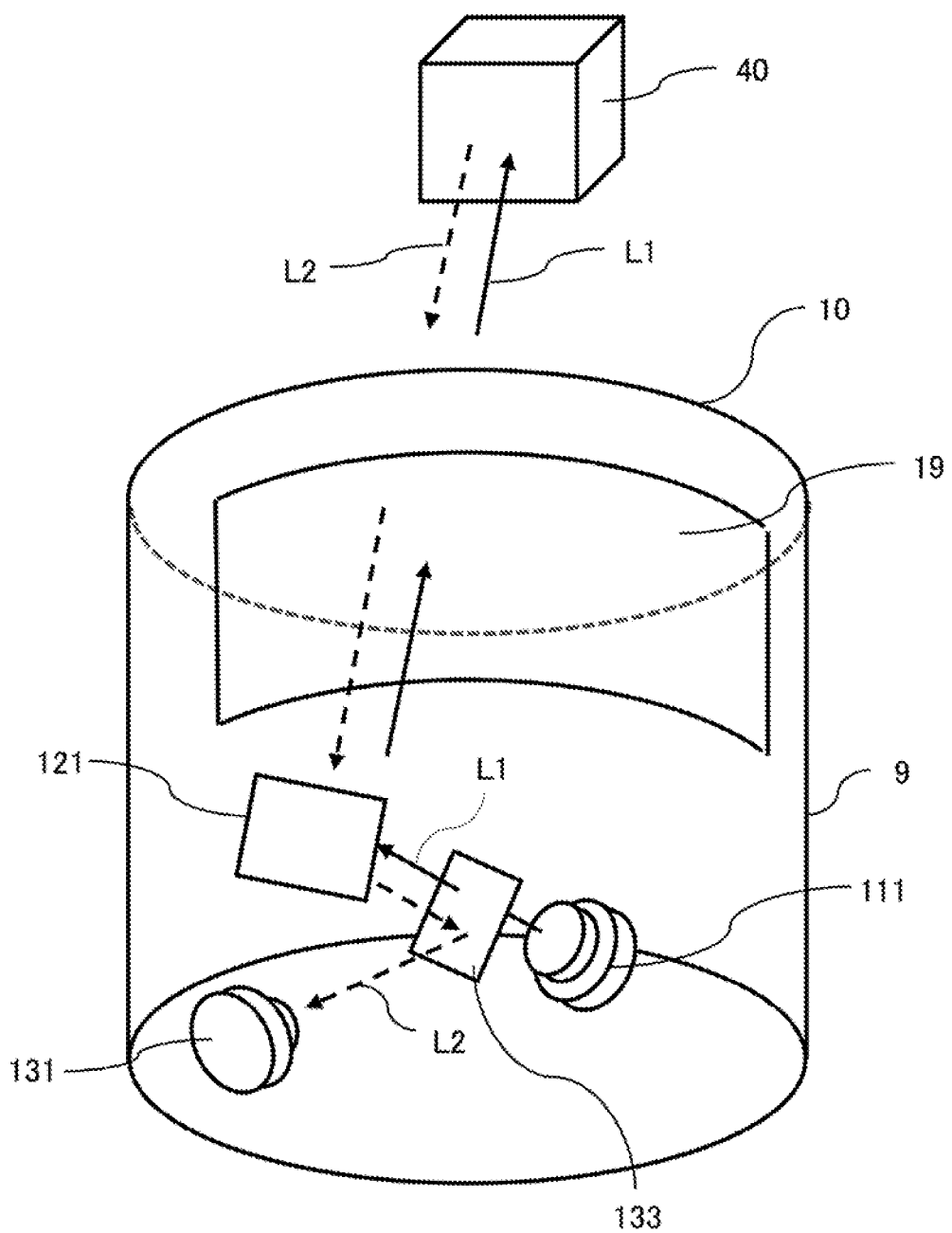
FIG. 2 is a schematic diagram of the laser distance measuring device according to Embodiment 1.

A laser distance measuring device according to Embodiment 1 will be described with reference to the drawings. FIG. 1 is a block diagram showing an outline of the configuration of a laser distance measuring device 10. FIG. 2 is a schematic diagram showing a schematic arrangement configuration of an optical system established by the laser distance measuring device 10. The laser distance measuring device 10 is also referred to as a LiDAR (Light Detection and Ranging) or a laser radar. The laser distance measuring device 10 is mounted on a vehicle as an moving object, and radiates laser light L1 ahead of the moving object while two-dimensionally scanning the light, to thereby measure a distance from the laser distance measuring device 10 (moving object) to an object placed ahead of the moving object.

As shown in FIG. 1, the laser distance measuring device 10 includes a laser light emission unit 11, a scanning mechanism 12, a light receiving unit 13, a scan control unit 14, a distance calculation unit 15, and the like. As will be also described later, the scan control unit 14 and the distance calculation unit 15 are included in a control device 20. The laser light emission unit 11 emits the laser light L1. The scanning mechanism 12 is a mechanism for changing the output angle of the laser light L1. The scan control unit 14 controls the output angle of the laser light L1 by means of the scanning mechanism 12 to thereby scan the laser light L1. The light receiving unit 13 receives reflected light L2 as laser light having been reflected off the object, to thereby output a light reception signal. The distance calculation unit 15 calculates based on the emitted laser light L1 and the light reception signal, an object distance that is a distance to the object.

1-1. Laser Light Emission unit 11

The laser light emission unit 11 emits the laser light L1. The laser light emission unit 11 includes a laser light source 111 and a laser-light-source driving circuit 112. Based on a command signal from a light transmission-reception control unit 16 to be described later, the laser-light-source driving circuit 112 generates a pulsed output signal. The laser light source 111, when the output signal transmitted thereto from the laser-light-source driving circuit 112 becomes an ON state, generates the laser light L1 of a near-ultraviolet wavelength and emits it toward the scanning mechanism 12. Note that the laser light L1 emitted from the laser light source 111 passes through a light collection mirror 133 disposed between the laser light source 111 and the scanning mechanism 12.

1-2. Scanning Mechanism 12

The scanning mechanism 12 changes the output angle of the laser light L1. In this embodiment, the scanning mechanism 12 changes the output angle of the laser light L1 to be radiated ahead of the moving object, in right/left direction X and up/down direction Y with respect the traveling direction of the moving object (irradiation center line). The scanning mechanism 12 includes a movable mirror 121 and a mirror driving circuit 122. As shown in FIG. 2, the laser light L1 emitted from the laser light source 111 is, after passing through the light collection mirror 133, reflected off the movable mirror 121, and then passes through a transmissive window 19 created in a casing 9, to be radiated ahead of the moving object at an output angle according to the angle of the movable mirror 121.

Figure 3:
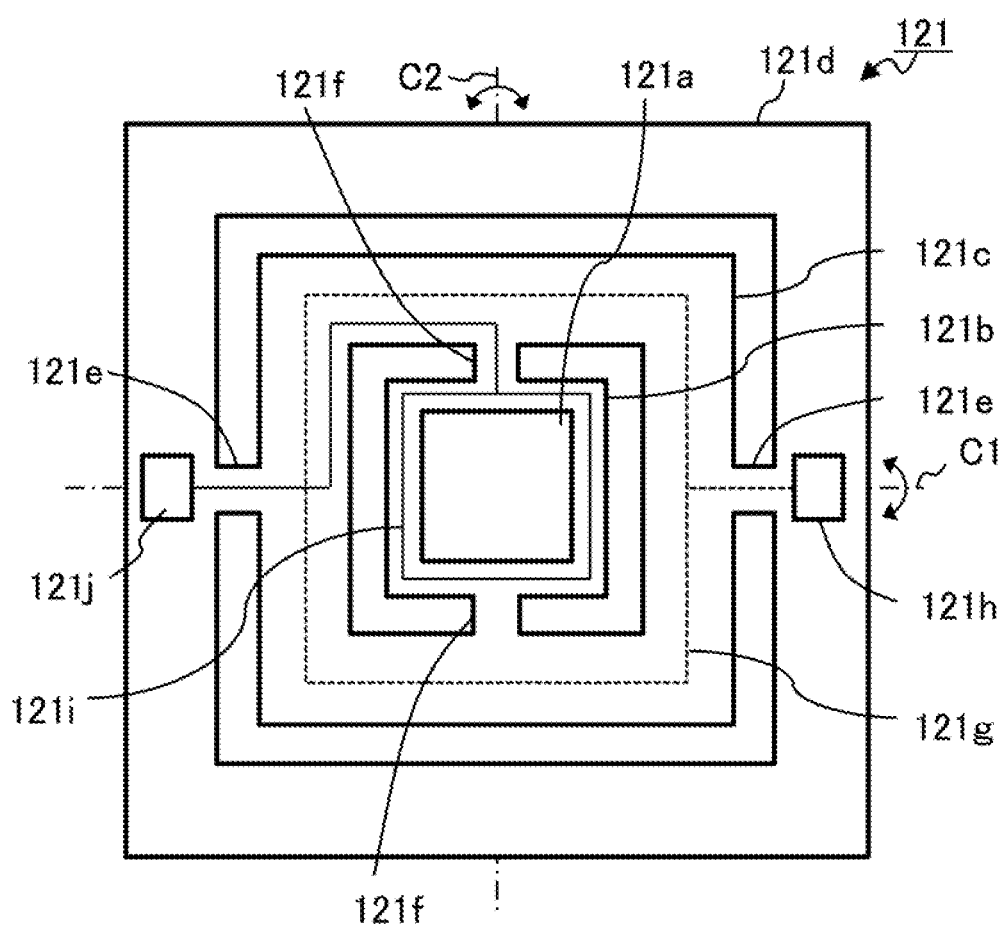
FIG. 3 is a top view showing a configuration of a movable mirror in the laser distance measuring device according to Embodiment 1.

In this embodiment, the movable mirror 121 is provided as a MEMS (Micro Electro Mechanical Systems) mirror 121. In FIG. 3, a top view of the MEMS mirror 121 as the movable mirror in the laser distance measuring device 10 according to Embodiment 1 is shown. As shown in FIG. 3, the MEMS mirror 121 includes a rotation mechanism for rotating a mirror 121a around a first axis C1 and a second axis C2 that are perpendicular to each other. The MEMS mirror 121 includes: a rectangular plate-like inside frame 121b on which the mirror 121a is provided; a rectangular ring plate-like intermediate frame 121c placed on the outside of the inside frame 121b; and a rectangular plate-like outside frame 121d placed on the outside of the intermediate frame 121c. The outside frame 121d is fixed to the body of the MEMS mirror 121.

The outside frame 121d and the intermediate frame 121c are joined together through two right-and-left first torsion bars 121e having torsional elasticity. The intermediate frame 121c can be twisted relative to the outside frame 121d and around the first axis C1 connecting the two first torsion bars 121e. When it is twisted to one side or the other side around the first axis C1, the output angle of the laser light L1 is changed upward or downward. The intermediate frame 121c and the inside frame 121b are joined together through two upper-and-lower second torsion bars 121f having elasticity. The inside frame 121b can be twisted relative to the intermediate frame 121c and around the second axis C2 connecting the two second torsion bars 121f. When it is twisted to one side or the other side around the second axis C2, the output angle of the laser light L1 is changed leftward or rightward.

With the intermediate frame 121c, a first coil 121g in a ring form along that frame is provided, and on the outside frame 121d, a first electrode pad 121h connected to the first coil 121g is provided. With the inside frame 121b, a second coil 121i in a ring form along that frame is provided, and on the outside frame 121d, a second electrode pad 121j connected to the second coil 121i is provided. In the MEMS mirror 121, an unshown permanent magnet is provided. When a plus-side or minus-side current flows in the first coil 121g, a Lorentz force is generated that twists the intermediate frame 121c to one side or the other side around the first axis C1, and the twisted angle is proportional to the magnitude of the current. When a plus-side or minus-side current flows in the second coil 121i, a Lorentz force is generated that twists the inside frame 121b to one side or the other side around the second axis C2, and the twisted angle is proportional to the magnitude of the current.

Figure 4A:
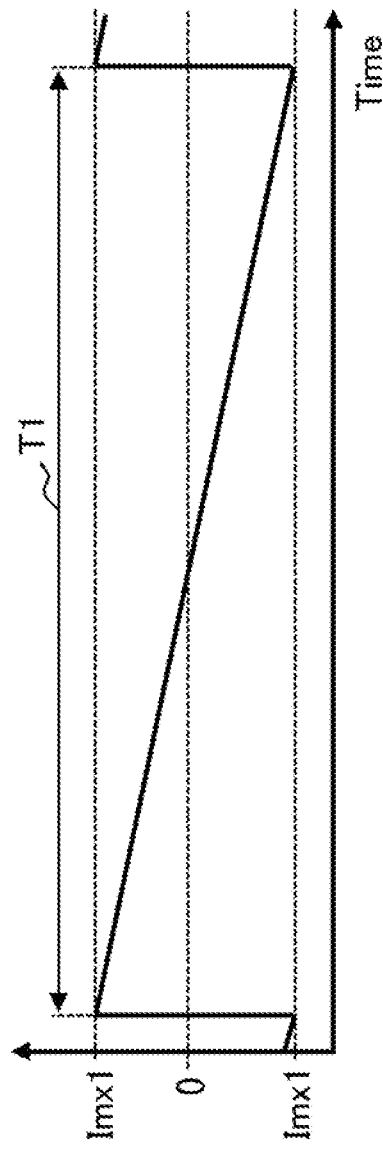
FIG. 4A and FIG. 4B are time charts for illustrating driving currents for the movable mirror in the laser distance measuring device according to Embodiment 1.
Figure 4B:
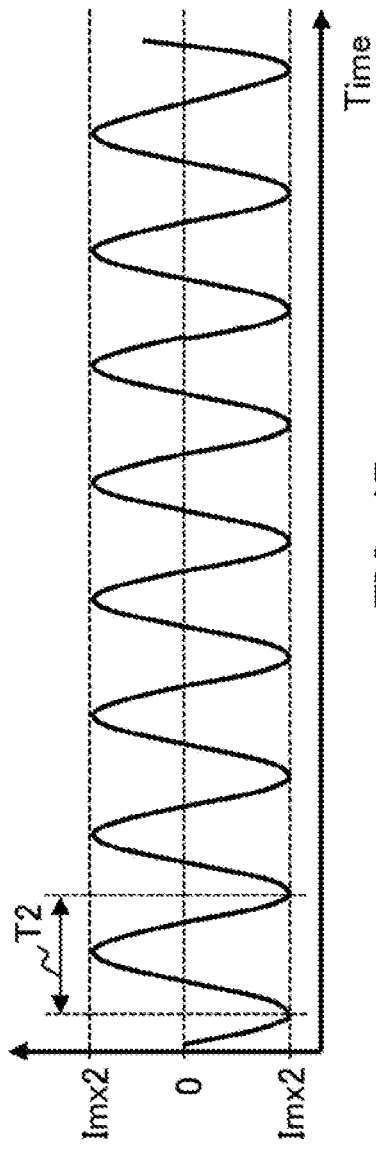

FIG. 4A and FIG. 4B are time charts for illustrating driving currents for the MEMS mirror 121 in the laser distance measuring device 10 according to Embodiment 1. FIG. 4A is the time chart of the driving current in the first coil 121g, and FIG. 4B is the time chart of the driving current in the second coil 121i.

As shown in FIG. 4A, according to a command signal from the scan control unit 14, the mirror driving circuit 122 supplies a current that pulsates at a first cycle T1 between a positive first maximum-current value Imx1 and a negative first minimum-current value Imn1, to the first coil 121g through the first electrode pad 121h. The first cycle T1 will be provided as a period corresponding to one frame by two-dimensional scanning. The pulsation wave of the current may be a saw-tooth wave, a triangular wave or the like.

Figure 5:
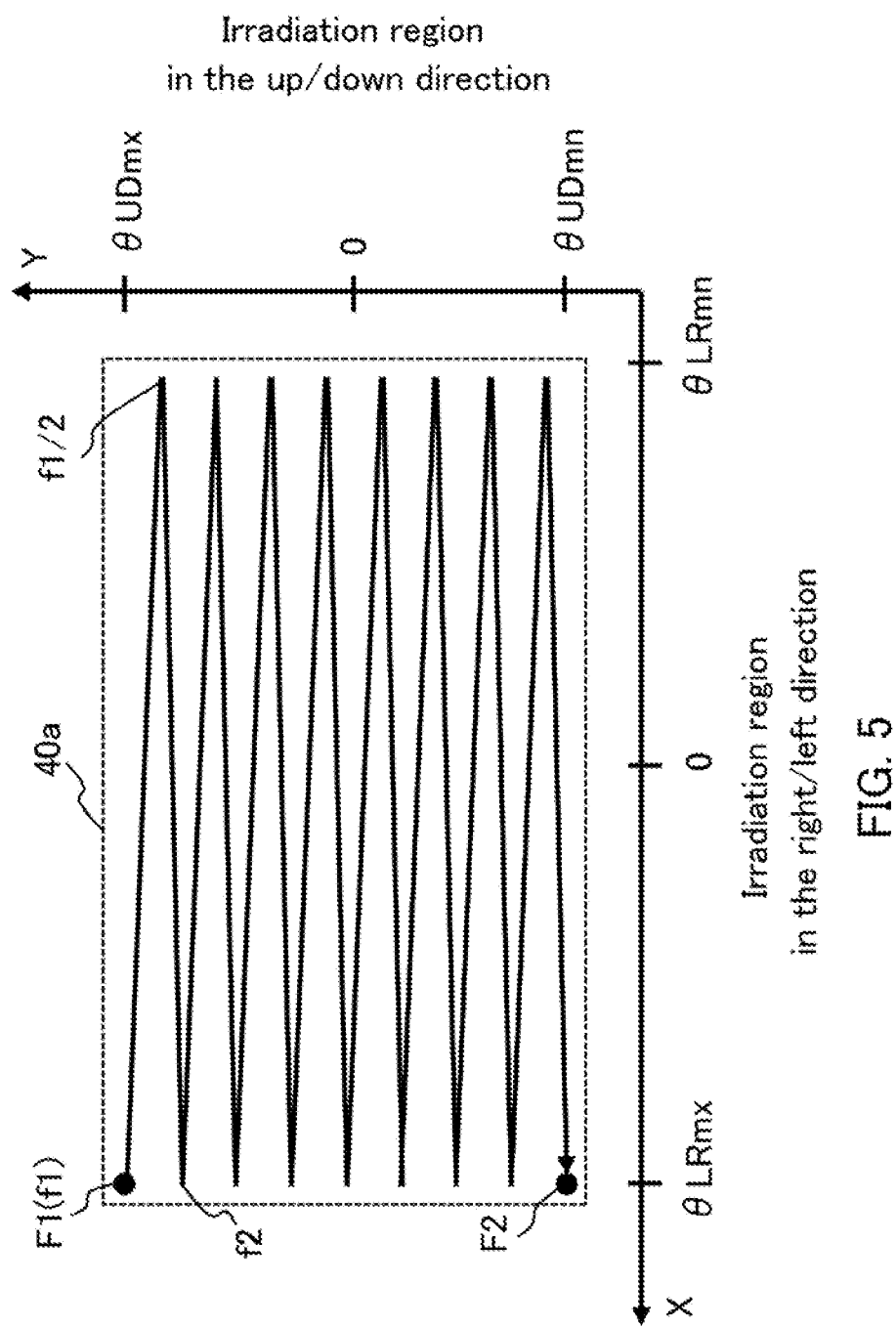
FIG. 5 is a diagram for illustrating irradiation region in up/down and right/left directions by the laser distance measuring device according to Embodiment 1.

In FIG. 5, there is shown a diagram for illustrating an irradiation region 40a in the up/down direction (perpendicular direction) Y and the right/left direction (horizontal direction) X by the laser distance measuring device 10 according to Embodiment 1. One scanning over the irradiation region 40a as a two-dimensional scanning field will be referred to as one frame.

With respect to the up/down direction (perpendicular direction) Y, as shown in FIG. 5, scanning is accomplished by swinging the laser light L1 at the first cycle T1 between the position of a one-frame start point F1 (a maximum radiation angle θUDmx in the up/down direction Y that corresponds to the positive first maximum-current value Imx1) and the position of a one-frame end point F2 (a minimum radiation angle θUDmn in the up/down direction Y that corresponds to the negative first minimum-current value Imn1), while swinging the laser light in the right/left direction X. The transition between the first maximum-current value Imx1 and the first minimum-current value Imn1 may be varied depending on the conditions of operation.

Further, as shown in FIG. 4B, according to a command signal from the scan control unit 14, the mirror driving circuit 122 supplies a current that pulsates at a second cycle T2 between a positive second maximum-current value Imx2 and a negative second minimum-current value Imn2, to the second coil 121i through the second electrode pad 121j. The second cycle T2 is set to a value shorter than that of the first cycle T1, and is set to a value resulting from division of the first cycle T1 by the number of times N of reciprocating scanning in the right/left direction X in the one frame. The pulsation wave of the current may be a sine wave, a rectangular wave or the like.

With respect to the right/left direction (horizontal direction) X, as shown in FIG. 5, scanning is accomplished up to the one-frame end point F2 placed in the right direction (perpendicular direction) Y, in such a manner that the laser light L1 is swung between a start point f1 for "one frame/N" (a minimum radiation angle θLRmn in the right/left direction X that corresponds to the negative second minimum-current value Imn2) and a halfway point f1/2 corresponding to "one frame/2N" (a maximum radiation angle θLRmx in the right/left direction X that corresponds to the positive second maximum-current value Imx2), so as to return to an end point f2 for "one frame/N" (the minimum radiation angle θLRmn in the right/left direction X that corresponds to the negative second minimum-current value Imn2), and this operation is repeated at the second cycle T2. The transition between the second maximum-current value Imx2 and the second minimum-current value Imn2 may be varied depending on the conditions of operation. In this manner, by means of the scanning mechanism 12, it is possible to scan the laser light L1 over the irradiation region 40a.

1-3. Light Receiving Unit 13

The light receiving unit 13 receives the reflected light L2 of the laser light reflected off an object 40 (irradiation region 40a) placed ahead of the moving object (laser distance measuring device 10). The light receiving unit 13 includes a light detector 131, a light-detector control circuit 132 and the light collection mirror 133. As shown in FIG. 2, the reflected light L2 reflected off the object 40 that is placed ahead of the moving object, passes through the transmissive window 19 and is then reflected off the movable mirror 121, and thereafter it is further reflected off the light collection mirror 133 to thereby enter the light detector 131.

The light detector 131 includes an APD (Avalanche Photo Diode) or the like as a light receiving element, and outputs the light reception signal corresponding to the received reflected light L2. The light-detector control circuit 132 controls the operation of the light detector 131 on the basis of a command signal from the light transmission-reception control unit 16. In addition, in the light-detector control circuit 132, a power circuit for applying electric power to the light receiving element of the light detector 131 is included. The light reception signal outputted by the light detector 131 is inputted to the control device 20 (distance calculation unit 15).

1-4. Control Device 20

Figure 6:
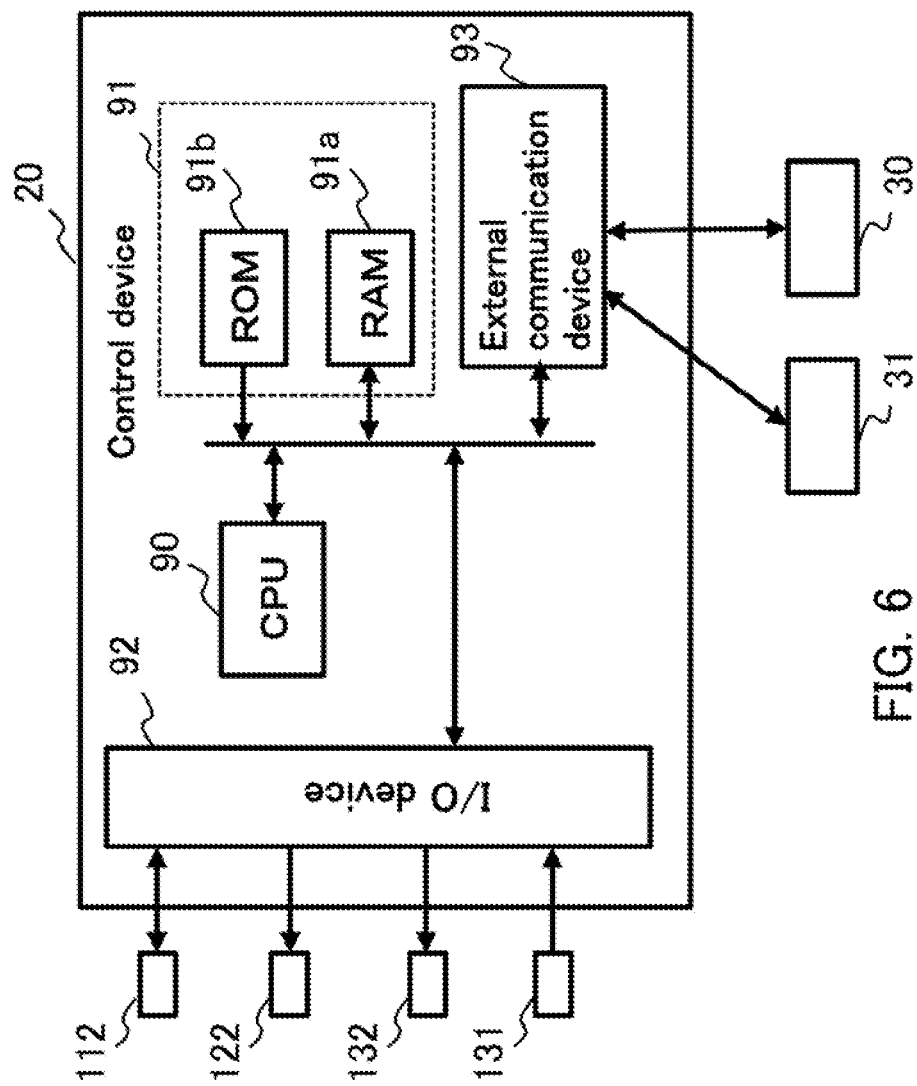
FIG. 6 is a hardware configuration diagram of a control device in the laser distance measuring device according to Embodiment 1.

The laser distance measuring device 10 includes the control device 20. The control device 20 includes functional units, such as the scan control unit 14, the distance calculation unit 15, the light transmission-reception control unit 16 and the like. The respective functions of the control nit 20 are implemented by a processing circuit included in the control device 20. In FIG. 6, a hardware configuration diagram of the control device 20 in the laser distance measuring device 10 according to Embodiment 1 is shown. As shown in FIG. 6, the control device 20 includes as the processing circuit: an arithmetic processing device 90 (computer) such as a CPU (Central Processing Unit) or the like; a storage device 91 that communicates data with the arithmetic processing device 90; an I/O device 92 that inputs/outputs signals externally to/from the arithmetic processing device 90; an external communication device 93 that establishes data communications with a device outside the laser distance measuring device 10; and the like.

In the arithmetic processing device 90, an ASIC (Application Specific Integrated Circuit), an IC (Integrated Circuit), a DSP (Digital Signal Processor), an FPGA (Field Programmable Gate Array), any one of various types of other logic circuits, any one of various types of other signal processing circuits, and/or the like, may be included. Further, it is allowable that a plurality of arithmetic processing devices 90 of the same type or different types is provided, so that the respective processing are executed separately by these devices. As the storage device 91, there are provided a RAM (Random Access Memory) 91a that is configured to allow reading and writing data from the arithmetic processing device 90, a ROM (Read Only Memory) 91b that is configured to allow reading data from the arithmetic processing device 90, and the like. Note that, as the storage device 91, any one of various types of other storage devices, such as a flash memory, an EEPROM (Electrically Erasable Programmable Read Only Memory) or the like, may be used.

The I/O device 92 is connected to the laser-light-source driving circuit 112, the mirror driving circuit 122, the light detector 131, the light-detector control circuit 132, etc., and includes a communication circuit, an A/D converter, a D/A converter, I/O ports, etc. for establishing transmission/reception of data and control commands between the above components and the arithmetic processing device 90. Further, the I/O device includes an arithmetic processing device for controlling the respective circuits. The external communication device 93 establishes communications with external devices, such as, a car navigation device 30, an external arithmetic processing device 31, etc.

The respective functions of the respective functional units 14 to 16, etc. included in the control device 20 are implemented in such a manner that the arithmetic processing device 90 executes software (programs) stored in the storage device 91 such as a ROM or the like, to work in collaboration with other hardware, such as, the storage device 91, the I/O device 92, the external communication device 93, etc. in the control device 20. Note that set data such as the numbers of times of processing, etc. to be used by the respective functional units 14 to 16, etc. are stored as a part of the software (programs) in the storage device 91 such as a ROM or the like. The respective functions of the control device 20 will be detailed below.

<Light Transmission-Reception Control Unit 16>

The light transmission-reception control unit 16 transmits a command signal to the laser-light-source driving circuit 112, to thereby cause the pulsed laser light L1 having a pulse width per pulse cycle Tp, to be outputted. Further, the light transmission-reception control unit 16 transmits a command signal to the light-detector control circuit 132, to thereby cause the light detector 131 to output the light reception signal.

<Scan Control Unit 14>

The scan control unit 14 controls the scanning mechanism 12 to thereby scan the laser light L1. In this embodiment, the scan control unit 14 accomplishes two-dimensional scanning by scanning the laser light L1 over an irradiation range in the right/left direction X with respect to the traveling direction of the moving object and by scanning, at the same time, the laser light L1 over an irradiation range in the up/down direction Y with respect to the traveling direction of the moving object.

The scan control unit 14 transmits to the mirror driving circuit 122, a command signal for changing the output angle of the laser light L1 so that the laser light is scanned over the irradiation range in the up/down direction Y at the first cycle T1. Specifically, the scan control unit 14 transmits to the mirror driving circuit 122, the command signal including the positive first maximum-current value Imx1 and the negative first minimum-current value Imn1 related to the current to be supplied to the first coil 121$g$, and the first cycle T1.

Further, the scan control unit 14 transmits to the mirror driving circuit 122, a command signal for changing the output angle of the laser light L1 so that the laser light is scanned over the irradiation range in the right/left direction X at the second cycle T2. Specifically, the scan control unit 14 transmits to the mirror driving circuit 122, the command signal including the positive second maximum-current value Imx2 and the negative second minimum-current value Imn2 related to the current to be supplied to the second coil 121$i$, and the second cycle T2. The scan control unit 14 sets a value resulting from division of the first cycle T1 by the number of times N of reciprocating scanning in the right/left direction X in the one frame, as the second cycle T2.

<Distance Calculation Unit 15>

Figure 7:
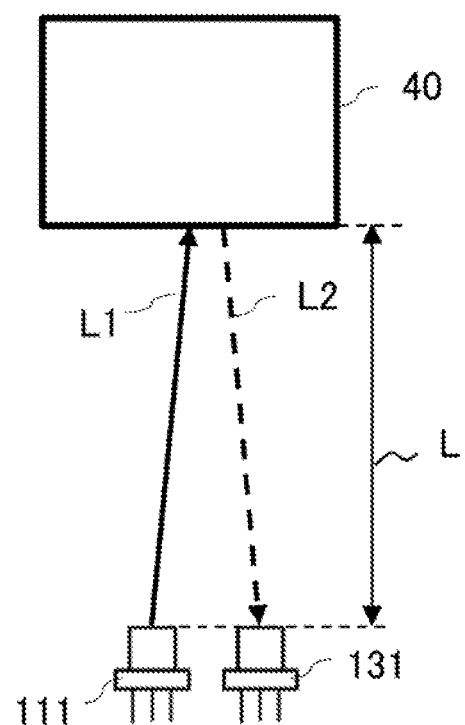
FIG. 7 is a diagram for illustrating how to detect a distance to an object under measurement by the laser distance measuring device according to Embodiment 1.
Figure 8:
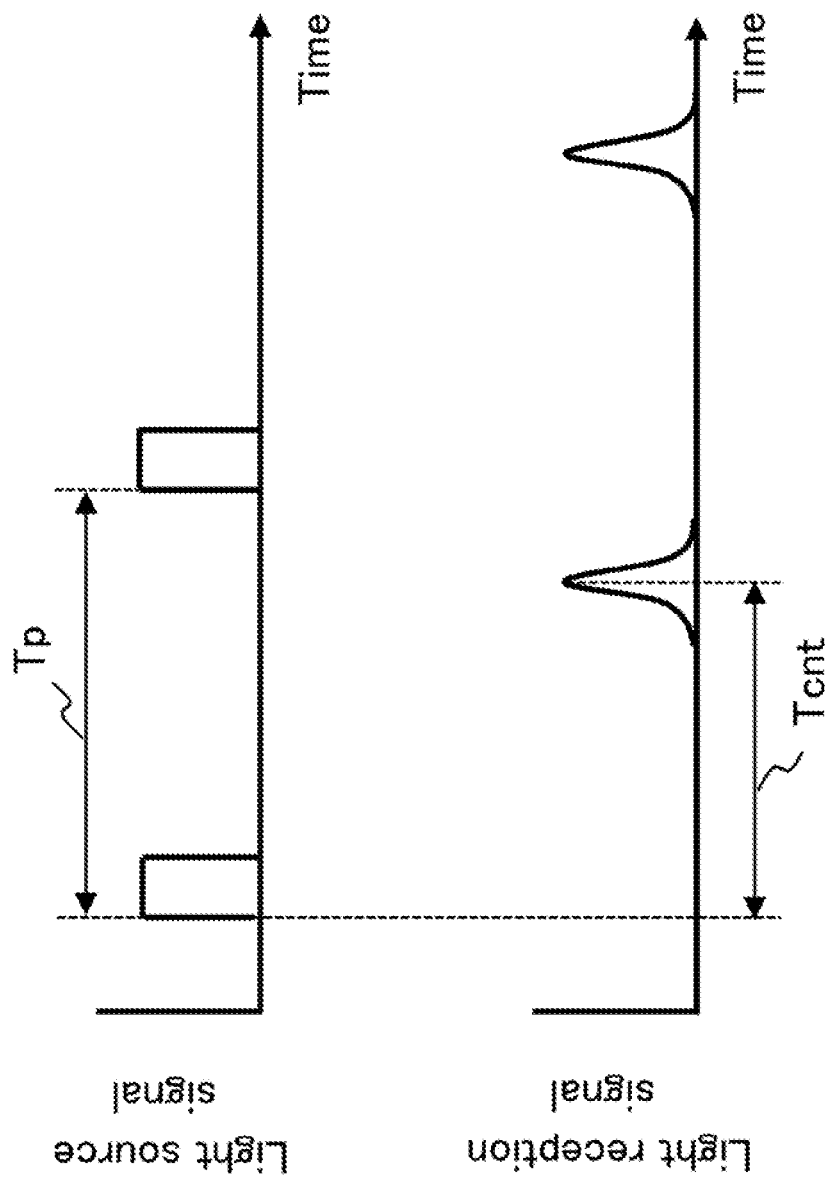
FIG. 8 is time charts for illustrating a light source signal and a light reception signal under measurement by the laser distance measuring device according to Embodiment 1.

The distance calculation unit 15 calculates based on the emitted laser light and the light reception signal, a distance to the object 40 found in the irradiation region 40$a$. FIG. 7 is a diagram for illustrating how to detect the distance to the object 40 under measurement by the laser distance measuring device according to Embodiment 1, and FIG. 8 is time charts for illustrating a light source signal and a light reception signal.

As shown in FIG. 7, the laser light L1 emitted from the laser light source 111 is reflected off the object 40 placed ahead by a distance L, and the thus-reflected light L2 enters the light detector 131 placed behind by the distance L. FIG. 8 shows a relationship between the light source signal for the laser light L1 emitted from the laser light source 111 and the reception signal of the reflected light L2 received by the light detector 131. The laser-light-source driving circuit 112 generates the pulsed output signal (light source signal) that becomes an ON state at the pulse cycle Tp. A time period Tcnt from the leading edge of the light source signal to the peak of the corresponding light reception signal is a time period in which the laser light L1 travels back and forth over the distance L between the laser light source 111 or the light detector 131 and the object 40. Thus, it is possible to calculate the distance L to the object 40 by multiplying the time period Tcnt by the velocity of light, and then dividing the resultant by 2.

The output signal (light source signal) from the laser-light-source driving circuit 112 to the laser light source 111 is also inputted to the distance calculation unit 15, so that the distance calculation unit can detect a time point at which the laser light emission unit 11 begins to emit the pulsed laser light. The distance calculation unit 15 measures the time period Tcnt from the time point at which the laser light emission unit 11 begins to emit the pulsed laser light until a time point at which the light receiving unit 13 outputs the light reception signal, as a light-receiving time period. Then, the distance calculation unit 15 calculates a value by multiplying the light-receiving time period Tcnt by the velocity of light c0 and then dividing the resultant by 2, as the distance L to the object found at the output angle at the time of emission of the laser light (L=Tcnt×c0/2). Note that, when the light receiving unit 13 does not output any light reception signal, the distance calculation unit 15 determines that the object 40 that may be found in the irradiation region 40$a$ at that time can not be detected, and thus does not calculate the distance L. The distance calculation unit 15 transmits the calculated result of the distance to the external arithmetic processing device 31.

<Problem about Intensity of Light Reception Signal>

Figure 9:
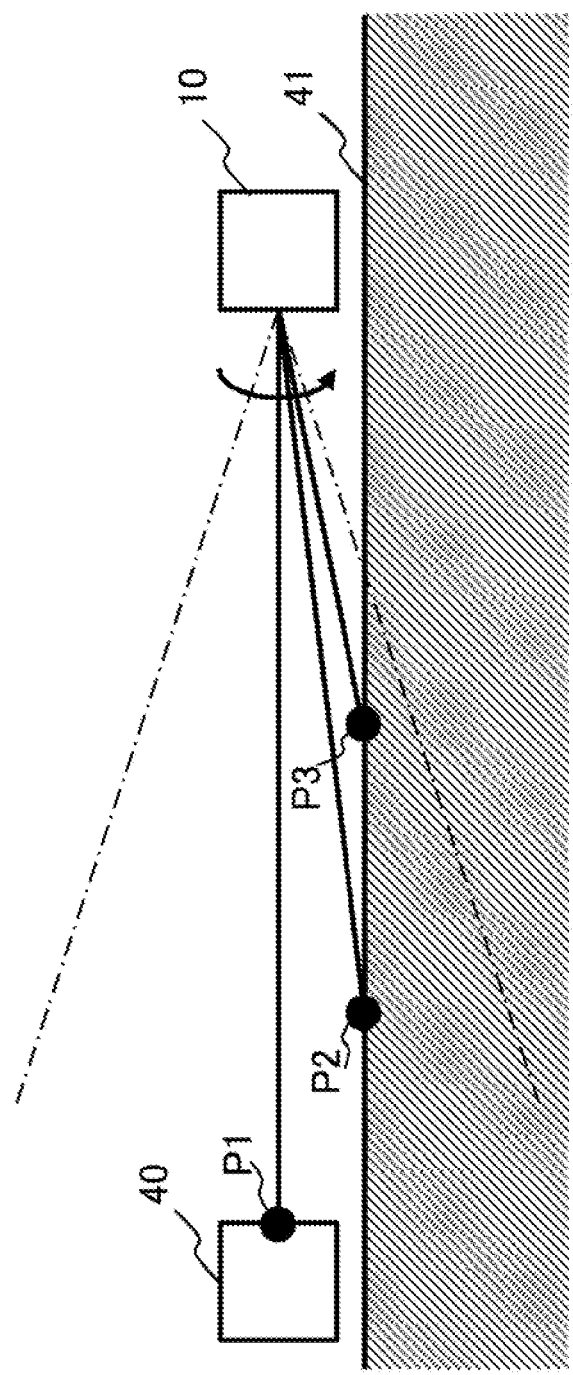
FIG. 9 is a diagram for illustrating behavior of the reception signal in the case of scanning laser light up and down, under measurement by the laser distance measuring device according to Embodiment 1.

FIG. 9 is a diagram for illustrating behavior of the reception signal in the case of scanning laser light up and down, under measurement by the laser distance measuring device according to Embodiment 1. In FIG. 9, respective irradiation positions P1, P2 and P3 at the time the output angle of the laser light is changed so that the laser light is scanned from the upper side to the lower side are shown, and a spot on the object 40 irradiated with the laser light at the position P1 is indicated by a filled circle. Further, spots on a ground surface 41 irradiated with the laser light at the positions P2, P3 are indicated by filled circles.

Figure 10:
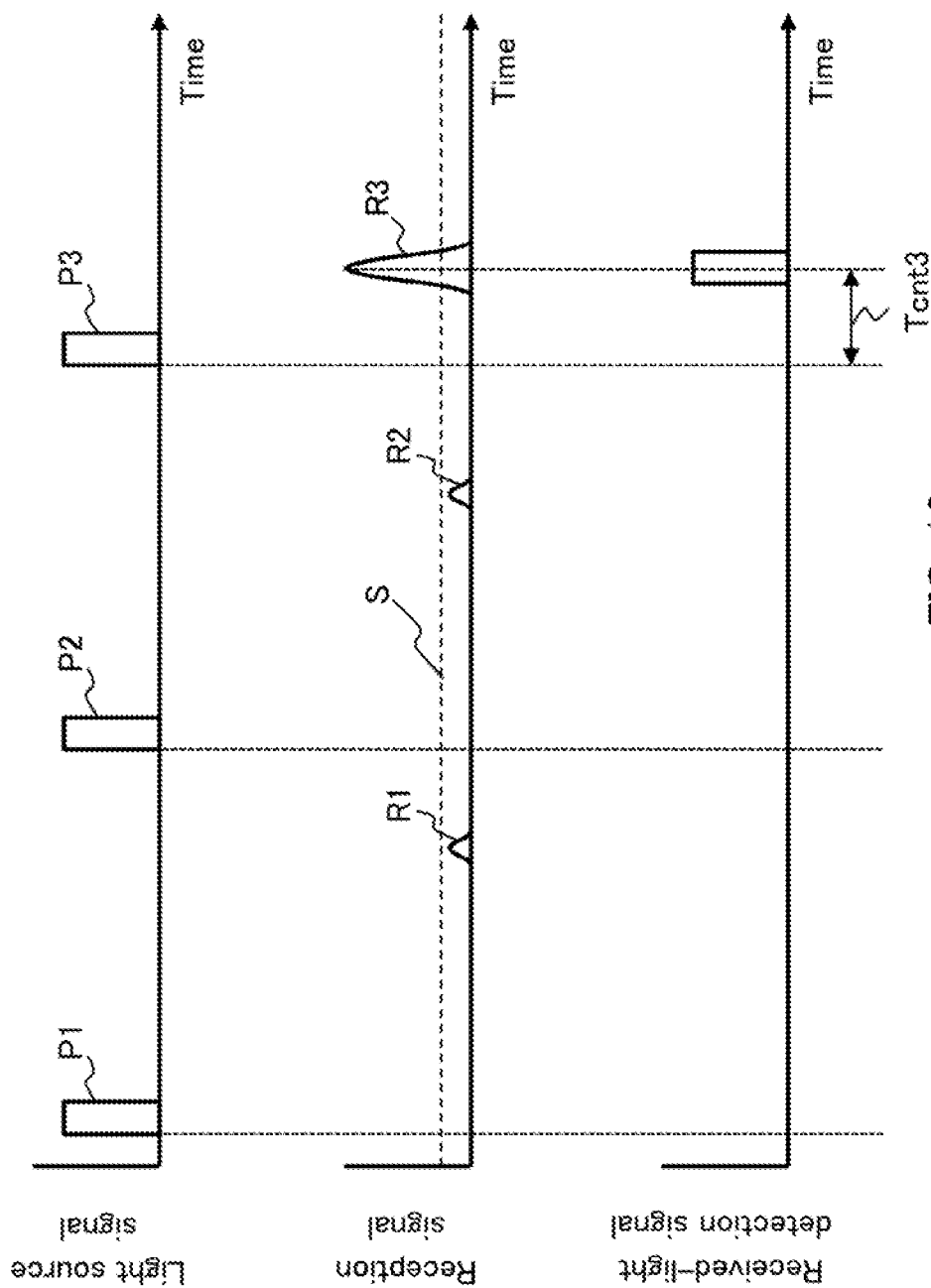
FIG. 10 is time charts for illustrating behavior of a reception signal under measurement by a laser distance measuring device according to a comparison example.

FIG. 10 is time charts for illustrating behavior of a reception signal under measurement by a laser distance measuring device according to a comparison example. By the laser distance measuring device according to the comparison example, as shown in FIG. 10, pulses of laser light are emitted at timings corresponding to the irradiation positions P1, P2 and P3, and rays of reflected light reflected off the object 40 at the irradiation position P1 and reflected off the ground surface 41 at the irradiation positions P2, P3, enter a light detector 131, so that light reception signals R1, R2 and R3 are outputted. Since the light reception signal R3 exceeds a threshold value S, a received-light detection signal in a pulse form is outputted. However, since the light reception signals R1, R2 have low signal peaks and do not exceed the threshold value S, no received-light detection signal is outputted. This makes it unable to measure a distance.

Such a phenomenon that the peak of the light reception signal becomes low, may occur in the case of bad weather such as rain, fog or the like, in a manner such that the laser light hits the raindrops or fog particles during traveling back and forth, to cause scattering of the light. Further, such a case may arise that the laser light hits dust particles floating in the air to cause scattering of the light. Hitting the raindrops, fog particles, dust particles or the like may occur in a random manner, and is thus difficult to predict. In addition, the farther the object is placed, the higher the possibility of hitting the raindrops, fog particles, dust particles or the like and thus the higher the frequency of the phenomenon that the peak of the light reception signal becomes low. Further, toward the short distance places from the moving object, such as a ground surface, a wall, a roof or the like, the laser light will less frequently hit the raindrops, fog particles, dust particles or the like, so that the signal attenuation is small and thus the peak of the light reception signal becomes higher.

<Change of Light Receiving Sensitivity>

In this embodiment, the light-detector control circuit 132 causes the light receiving sensitivity for the reflected light to be changed on the basis of the output angle of the laser light L1. The light-detector control circuit 132 is configured to transmit to the light detector 131, a control signal for changing the light receiving sensitivity for the reflected light, and the light detector 131 is configured to change the light receiving sensitivity.

Figure 11:
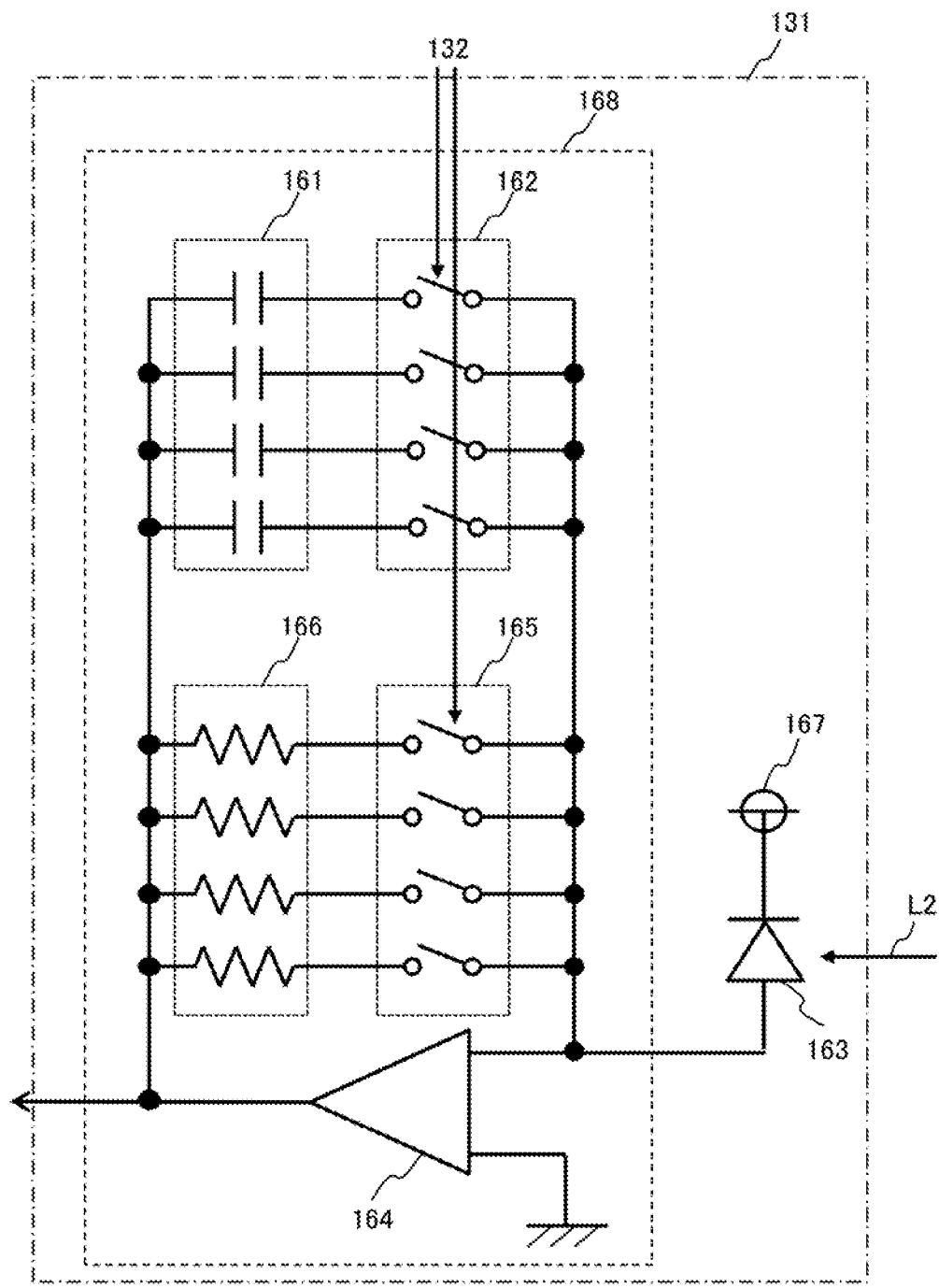
FIG. 11 is a circuit diagram showing a configuration of a gain and band change circuit in the laser distance measuring device according to Embodiment 1.

Specifically, in the light receiving unit 13, the light detector 131 has a gain and band change circuit for changing a gain for conversion (conversion gain) from an output signal of a light receiving element 163 to the reception signal, and for changing a bandwidth for the reception signal. FIG. 11 is a circuit diagram showing a configuration of a gain and band change circuit 168 in the laser distance measuring device 10 according to Embodiment 1. As shown in FIG. 11, the light detector 131 includes the gain and band change circuit 168 which is provided with a current-to-voltage conversion amplifier 164 (Transfer Impedance Amplifier: TIA) having a gain switching function. In the light detector 131, to the light receiving element 163 as an APD, a power source 167 for driving that element is connected, and the light receiving element 163 converts the received reflected light to a current. The converted current flows to the negative input side of the current-to-voltage conversion amplifier 164 that is an operational amplifier configured as a negative feedback circuit, and is then converted to a voltage through feedback resistors 166.

The multiple feedback resistors 166 (four resistors, in this example) are each connected in parallel to the current-to-voltage conversion amplifier 164. To the respective feedback resistors 166, respective switches 165 are serially connected, so that the operation of each feedback resistor 166 is switched between ON and OFF states by turning on/off each switch 165 (gain change circuit). According to the gain and band change circuit 168, when each switch 165 is turned on/off in response to a signal from the light-detector control circuit 132, the resistance value of the feedback resistors 166 as a while is changed, so that the conversion gain to be used at the time of converting the current to the voltage is changed.

It is noted that, according to the light detector 131, as the resistance value of the feedback resistors 166 as a whole in the gain and band change circuit 168 becomes larger, the conversion gain becomes larger, so that the light receiving sensitivity increases. Feedback capacitors 161 are connected in parallel to the feedback resistors 166, so that the signal-pass bandwidth is determined by the feedback resistors 166 and the feedback capacitors 161.

To the respective feedback capacitors 161 (four capacitors, in this example), respective switches 162 are serially connected, so that the operation of each feedback capacitor 161 is switched between ON and OFF states by turning on/off each switch 162 (band change circuit). According to the gain and band change circuit 168, when each switch 162 is turned on/off in response to a signal from the light-detector control circuit 132, the capacitance value of the feedback capacitors 161 as a while is changed, so that the signal bandwidth is changed according to the values of the feedback resistors 166 and the feedback capacitors 161.

Next, description will be made about set data indicating conversion gains and bandwidths for the gain and band change circuit in the laser distance measuring device according to Embodiment 1. FIG. 12 shows an example of the set data of resistance values for conversion gains and capacitance values for bandwidths. In FIG. 12, the radiation angle of the laser light L1 from the moving object is classified into three categories, namely, classified as a lower side angle (irradiation position P3), a middle angle (irradiation position P2) or a upper side angle (irradiation position P1), and for each of the categories, an ON/OFF command for the respective switches 165 and switches 162 is set (in FIG. 12, a resistance value of the feedback resistors 166 as a whole and a capacitance value of the feedback capacitors 161 as a whole are shown).

As shown in FIG. 12, according to an angular direction from the lower side angle through the middle angle to the upper side angle, the resistance value of the feedback resistors 166 changes from 38 kΩ through 42 kΩ to 46 kΩ, so that the conversion gain is increased. Further, the capacitance value of the feedback capacitors 161 changes from 0.2 pF through 0.4 pF to 0.6 pF, so that the bandwidth according to the filter constant determined by the capacitors together with the feedback resistors 166 is narrowed.

Accordingly, when the distance from the moving object is relatively short as represented by the lower side angle, the gain is decreased but the bandwidth is enlarged, whereas when the distance is long as represented by the upper side angle, the gain is increased but the bandwidth is narrowed to thereby further improve the relationship between the light reception signal and the noises. Thus, it is possible to improve the measuring capability.

As described above, the laser distance measuring device 10 according to Embodiment 1 comprises: the laser light emission unit 11 for emitting the laser light L1; the scanning mechanism 12 for scanning the laser light L1 by changing an output angle thereof; the light receiving unit 13 for receiving reflected light L2 of the laser light L1 from the object 40, to thereby output alight reception signal; the light-detector control circuit 132 for causing the light receiving unit to output the reception signal after setting a light receiving sensitivity for the reflected light L2 at the time when the output angle is small, higher than a light receiving sensitivity for the reflected light L2 at the time when the output angle is large; and the distance calculation unit 15 for calculating, based on the reception signal, a distance to the object 40. Thus, it is possible to enhance the distance measuring capability in both cases of measuring a short distance and a long distance.

It is noted that, in Embodiment 1, a case has been described as an example where the light-detector control circuit 132 is configured to change the conversion gain and the bandwidth. However, the light-detector control circuit 132 may be configured to change only one of the conversion gain and the bandwidth.

Figure 13:
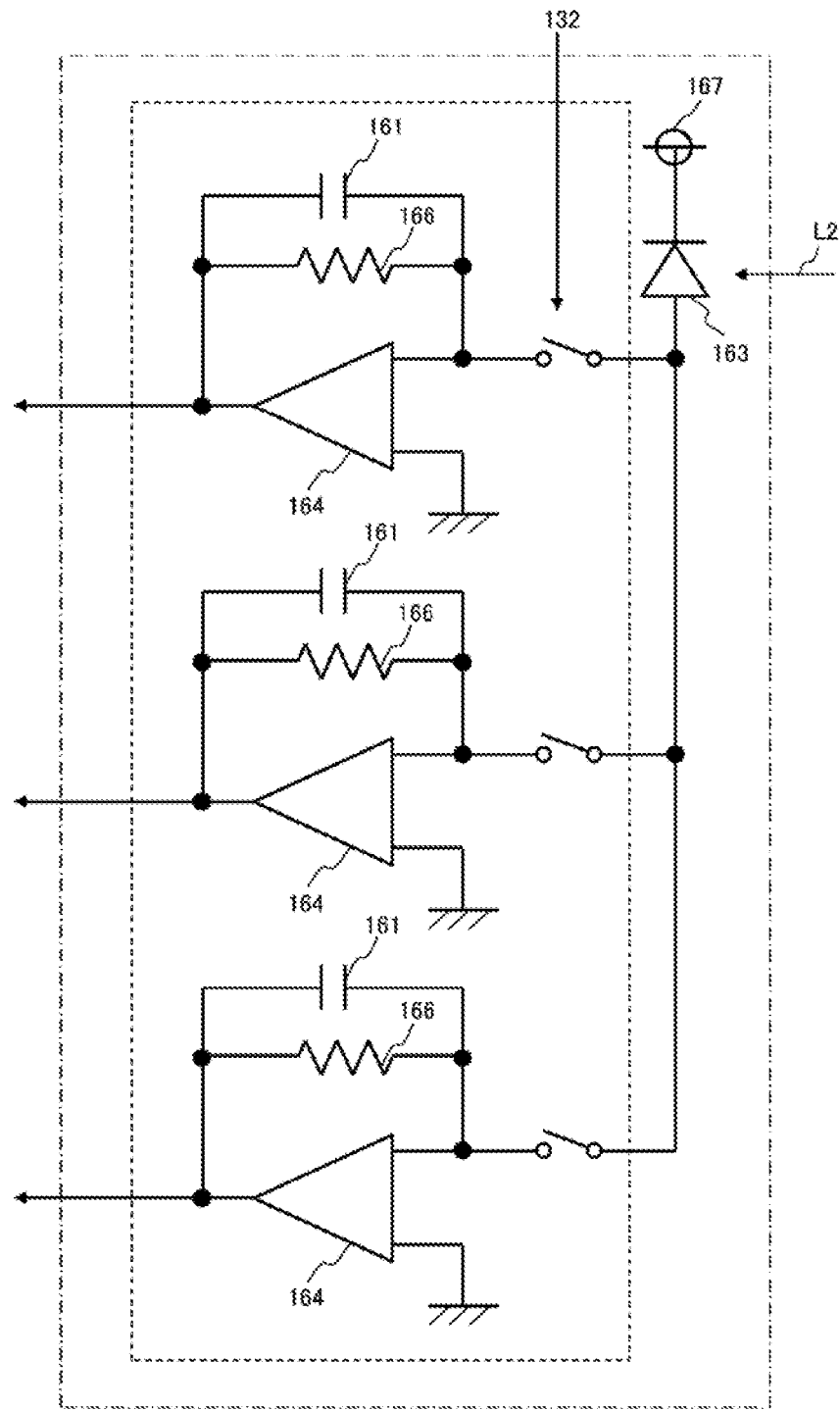
FIG. 13 is a circuit diagram showing another configuration of the gain and band change circuit in the laser distance measuring device according to Embodiment 1.
Figure 14:
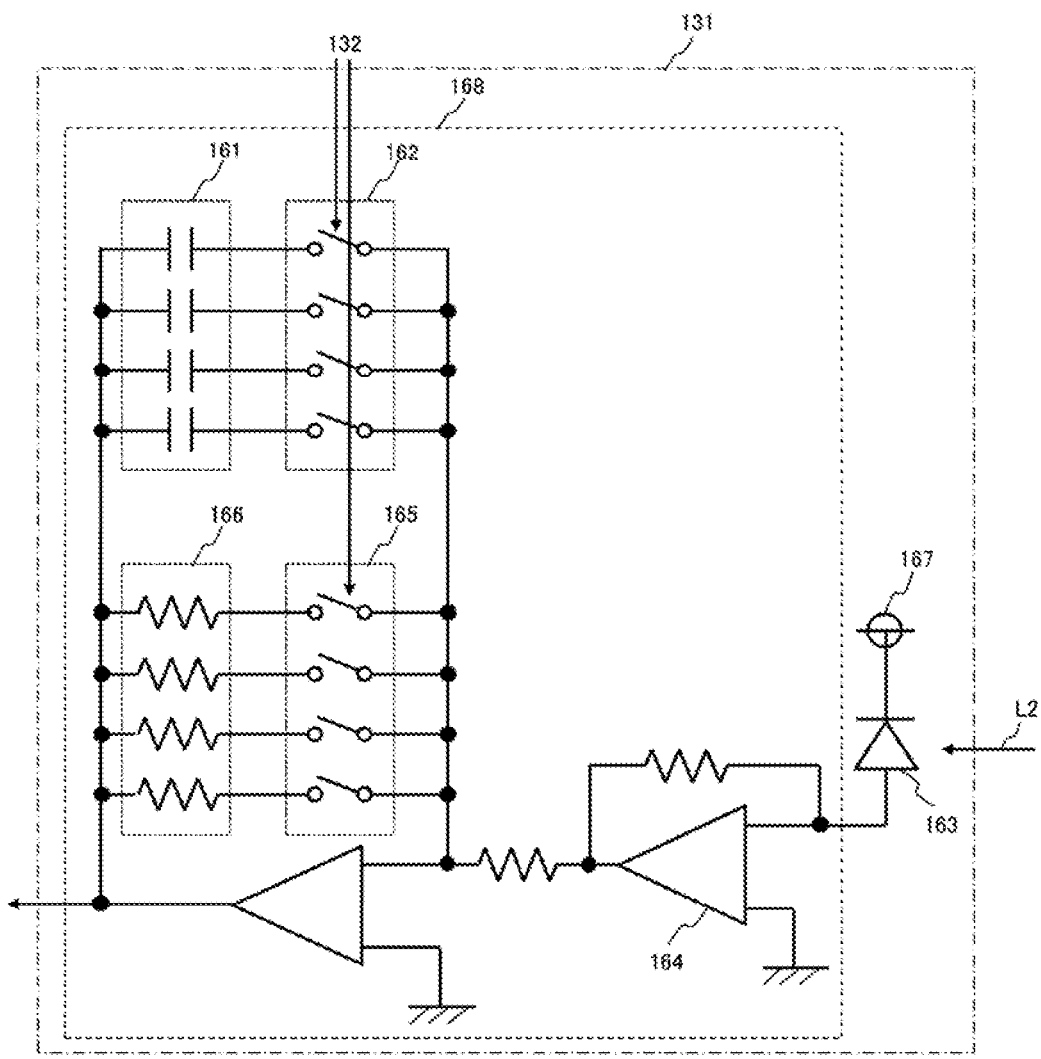
FIG. 14 is a circuit diagram showing still another configuration of the gain and band change circuit in the laser distance measuring device according to Embodiment 1.

Further, in the above embodiment, the conversion gain and the bandwidth of the light detector 131 are changed by turning on/off each of the switches connected to the feedback resistors 166 and the feedback capacitors 161; however, it is allowable to apply such a configuration in which, as shown in FIG. 13, circuits are provided each combining a current-to-voltage conversion amplifier 164, a feedback resistor 166 and a feedback capacitor 161, and each of the circuits is selected/unselected by a switch; or a configuration of a filter amplifier or the like in which, as shown in FIG. 14, the conversion gain and the bandwidth are determined at a stage after a current-to-voltage conversion amplifier 164.

Further, in the above embodiment, a case has been described as an example where the scanning mechanism 12 includes the MEMS mirror 121. However, the scanning mechanism 12 may include a scanning structure other than the MEMS mirror 121. For example, the scanning mechanism 12 may include a structure that is provided with a rotatable polygon mirror as the movable mirror and that can incline the rotation axis of the rotatable polygon mirror so that the irradiation range in the up/down direction is shifted upward or downward; or something like that.

Further, in the above embodiment, a case has been described as an example where the mirror that is small is moved by a Lorentz force. However, the moving mechanism for the small mirror is not limited to that of an electromagnetic type using a Lorentz force or the like, and may be that of a piezoelectric type employing a piezoelectric element, or that of an electrostatic type using an electrostatic force due to a potential difference between the mirror and an electrode.

Further, in the above embodiment, a case has been described as an example where two-dimensional scanning is accomplished using the MEMS mirror 121 and by performing scanning in a manner shown in FIG. 5. However, two-dimensional scanning may be accomplished using the MEMS mirror 121 and by performing Lissajous scanning or raster scanning, and may be accomplished using a spherical mirror by performing scanning in a precessional manner.

Further, in the above embodiment, a case has been described as an example where two-dimensional scanning is accomplished using the MEMS mirror 121 in which a mirror is turned around the two rotation axes. However, such a configuration may be applied that uses two MEMS mirrors in each of which a mirror is turned around a single axis, to accomplish two-dimensional scanning.

Further, in the above embodiment, a case has been described as an example where laser light from one laser light source 111 is reflected off the MEMS mirror 121. However, such a configuration may be applied in which rays of laser light from a plurality of laser light sources 111 are reflected off the MEMS mirror 121.

Further, in the above embodiment, a case has been described as an example where the light detector 131 receives the reflected light L2 reflected off the MEMS mirror 121 and the light collection mirror 133. However, such a configuration may be applied in which the light detector 131 directly receives the reflected light L2 reflected off an object.

Further, in the above embodiment, the laser distance measuring device is of a type that transmits/receives the pulsed light using an incoherent detection method; however, it may be of a type that transmits/receives the pulsed light using a coherent detection method. Further, it may be of a type that transmits/receives laser light modulated in intensity by a sine wave, and may be of an incoherent FMCW (Frequency Modulated Continuous Waves) type or a coherent FMCW type. When it is of the type that transmits/receives the light modulated in intensity by a sine wave, the modulation frequency of the sine wave is set variable, instead of the pulse width of the laser light being set variable. When it is of the incoherent FMCW or coherent FMCW type, the frequency sweeping width of the modulation frequency is set variable, instead of the pulse width of the laser light being set variable.

In this application, a variety of exemplary embodiments and examples are described; however, every characteristic, configuration or function that is described in one or more embodiments is not limited to being applied to a specific embodiment, and may be applied singularly or in any of various combinations thereof to an embodiment. Accordingly, an infinite number of modified examples that are not exemplified here are supposed within the technical scope disclosed in the present description. For example, such cases shall be included where at least one configuration element is modified; where any configuration element is added or omitted; and additionally where at least one configuration element is extracted and combined with a configuration element of another embodiment.

What is claimed is:

1. A laser distance measuring device, comprising:
a laser light emissioner for emitting laser light;
a scanner for scanning the laser light by changing an output angle thereof;
a light receiver for receiving reflected light of the laser light from a reflector, to thereby output a light reception signal;
a controller for causing the light receiver to output the reception signal after setting a light receiving sensitivity to a first light receiving sensitivity for the reflected light at the time when the output angle is within a first range of angles, and to output the reception signal after setting the light receiving sensitivity to a second light receiving sensitivity lower than the first light receiving sensitivity for the reflected light at the time when the output angle is within a second range of angles different from the first range of angles; and
a distance calculator for calculating, based on the reception signal, a distance to the reflector.

2. The laser distance measuring device according to claim 1, wherein the light receiver includes a gain change circuit for changing a gain for conversion from an output signal of a light receiving element to the reception signal; and wherein the controller sets the light receiving sensitivity for the reflected light, by means of the gain change circuit.

3. The laser distance measuring device according to claim 2, wherein the scanner changes the output angle by means of a movable mirror.

4. The laser distance measuring device according to claim 3, wherein the movable mirror uses either one of a MEMS mirror, a rotatable polygon mirror and a spherical mirror.

5. The laser distance measuring device according to claim 1, wherein the light receiver includes a band change circuit for changing a signal bandwidth for the reception signal; and wherein the controller sets the light receiving sensitivity for the reception signal, by means of the band change circuit.

6. The laser distance measuring device according to claim 5, wherein the scanner changes the output angle by means of a movable mirror.

7. The laser distance measuring device according to claim 6, wherein the movable mirror uses either one of a MEMS mirror, a rotatable polygon mirror and a spherical mirror.

8. The laser distance measuring device according to claim 1, wherein the light receiver includes a gain change circuit for changing a gain for conversion from an output signal of a light receiving element to the reception signal, and a band change circuit for changing a signal bandwidth for the reception signal; and wherein the controller sets the light receiving sensitivity for the reception signal, by means of the gain change circuit and the band change circuit.

9. The laser distance measuring device according to claim 8, wherein the scanner changes the output angle by means of a movable mirror.

10. The laser distance measuring device according to claim 9, wherein the movable mirror uses either one of a MEMS mirror, a rotatable polygon mirror and a spherical mirror.

11. The laser distance measuring device according to claim 1, wherein the scanner changes the output angle by means of a movable mirror.

12. The laser distance measuring device according to claim 11, wherein the movable mirror uses either one of a MEMS mirror, a rotatable polygon mirror and a spherical mirror.

* * * * *